(No Model.) 2 Sheets—Sheet 1.

G. W. FOGG.
WATER JACKET FOR SMELTING FURNACES.

No. 248,642. Patented Oct. 25, 1881.

Witnesses
Geo. H. Strong
Frank A. Brooks

Inventor
George W. Fogg
By Dewey & Co.
Attys

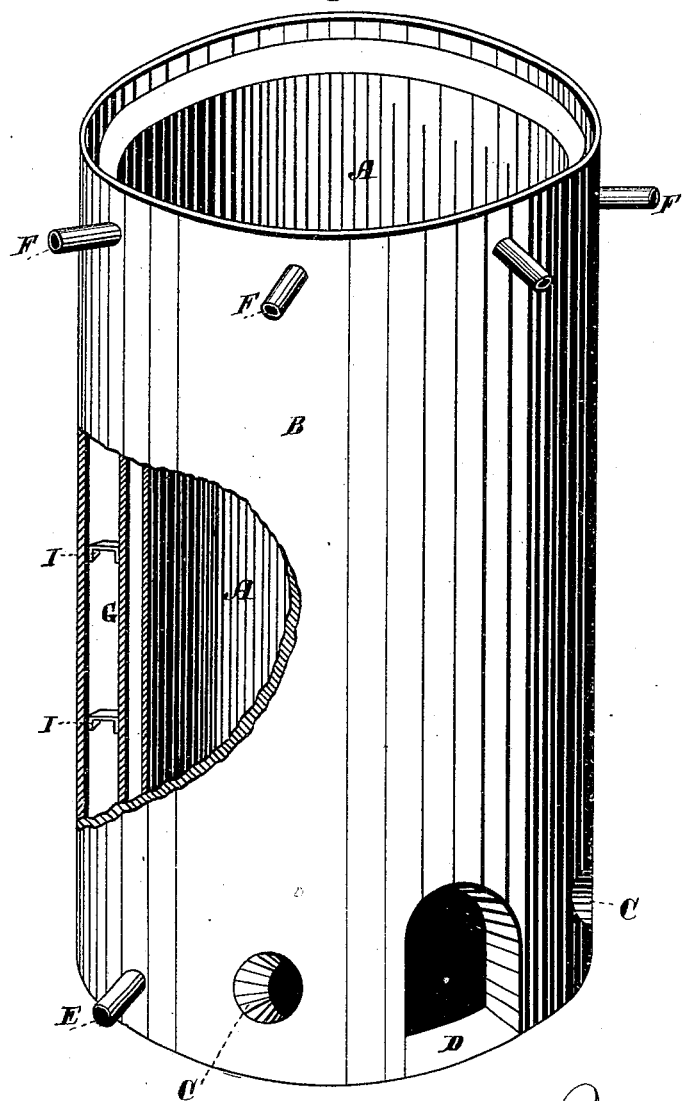

UNITED STATES PATENT OFFICE.

GEORGE W. FOGG, OF SAN FRANCISCO, CALIFORNIA, ASSIGNOR OF ONE-HALF TO ALBERT P. BRAYTON, OF SAME PLACE.

WATER-JACKET FOR SMELTING-FURNACES.

SPECIFICATION forming part of Letters Patent No. 248,642, dated October 25, 1881.

Application filed June 14, 1881. (No model.)

*To all whom it may concern:*

Be it known that I, GEORGE W. FOGG, of the city and county of San Francisco, State of California, have invented an Improved Water-Jacket for Smelting-Furnaces; and I hereby declare the following to be a full, clear, and exact description thereof.

My invention relates to certain improvements in smelting-furnaces; and it consists in a peculiar construction of a double inclosing-wall, forming a space within which water is admitted; and also in the employment within this space of an intermediate cylindrical diaphragm, which is so supported as to leave a space at the top and at the bottom through which water may pass, and by this means a complete circulation is kept up and the interior surface of the furnace may be kept cool, the water being supplied and discharged by suitable inlet and outlet passages.

Figure 2:
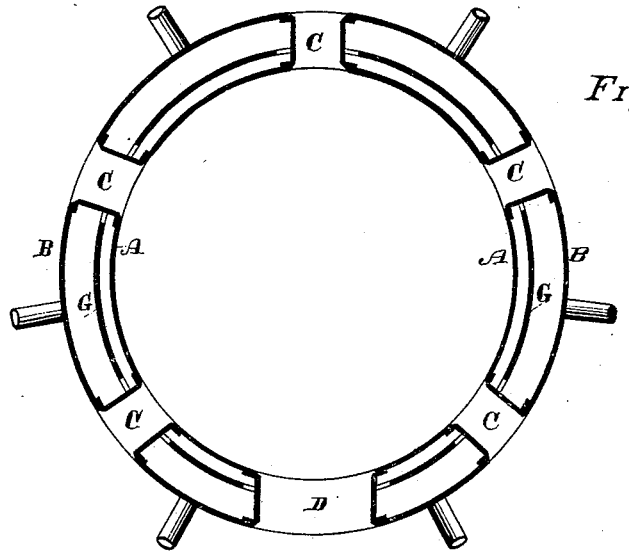
Figure 1:
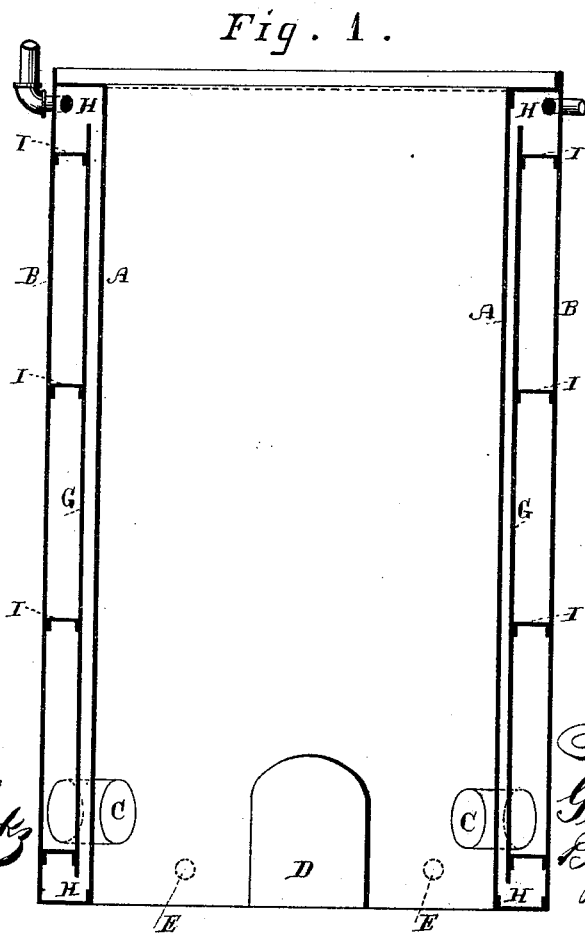

Referring to the accompanying drawings for a more complete explanation of my invention, Figure 1 is a vertical section of my apparatus. Fig. 2 is a horizontal section. Fig. 3 is an exterior view.

A is the inner, and B is the outer, wall of my furnace, and C are the tuyere-openings through which the blast is admitted to the interior of the furnace.

D is the door through which the slag and refuse is drawn out.

Water is admitted into the space between the walls A B of the furnace through the pipes E, which may enter at any point; but I prefer to connect them near the bottom, as shown. The water is discharged through the pipes F, a current being kept up by means of a pump, an elevated pressure-tank, or other device.

In order to keep up a more perfect circulation and bring a cold body of water against the inner hot wall of the furnace, I form a cylindrical shell, G, of iron, of such a size that it will form a vertical cylindrical partition between the outer and inner walls. This shell is made of such a length as to leave a space, H H, above and below it, through which the water may flow freely. Braces I extend inward from the outer shell, and are bolted or riveted to it and the cylinder G, so as to support the latter and hold it in place.

The operation will then be as follows: Water being forced in through the ingress-pipe, will flow to a point where it can pass below the lower edge of the shell G, and thence up between it and the inner shell to the top. In its upward passage it also flows around the tuyere-openings, and is also caused to spread around the inner cylinder. At the top it flows outward through the upper passage, H, and the cooler water descends between the outer shell and the shell G to the bottom, and thence flows upward again in the narrow space between the shell G and the inner wall, A, of the furnace. A circulation may also take place through the openings in this shell around the tuyeres.

By this construction I am enabled to force a strong current of cold water continually against the inner wall of the furnace and thus keep it cool, and the water is used with the greatest economy, being forced in at all sides of the furnace. When it becomes warm the heated portion will escape through the pipes F at the top, the flow being controlled by suitable cocks.

Having thus described my invention, what I claim as new, and desire to secure by Letters Patent, is—

1. The improvement in smelting-furnaces consisting of the double walls A B, having the interposed shell G, with a space above and below, as shown, and the ingress and egress pipes E F, substantially as and for the purpose herein described.

2. In a smelting-furnace having the inner and outer walls, A B, the tuyeres or air-blast openings C, and the discharge-door D, the intermediate shell, G, supported so as to form spaces between itself and the outer and the inner shells respectively, and passages H above and below it, in combination with the water-pipes E F, substantially as and for the purpose herein described.

In witness whereof I have hereunto set my hand.

GEO. W. FOGG.

Witnesses:
 T. H. JUDD,
 A. H. HOADLEY.